United States Patent

[11] 3,571,633

[72] Inventor Jan Timmerman
 Eindhoven, Netherlands
[21] Appl. No. 488,616
[22] Filed Sept. 20, 1965
[45] Patented Mar. 23, 1971
[73] Assignee U.S. Philips Corporation
 New York, N.Y.
[32] Priority Sept. 23, 1964
[33] Netherlands
[31] 6411060

[54] VIBRATOR MOTORS
 9 Claims, 3 Drawing Figs.
[52] U.S. Cl. .................................. 310/29, 310/36
[51] Int. Cl. ................................. H02k 33/00

[50] Field of Search ............................ 310/21, 29, 36, 38; 30/43.91, (Inquired)

[56] References Cited
UNITED STATES PATENTS
3,105,163  9/1963  Camp .................. 310/29
3,343,011  9/1967  Daniels et al. .......... 310/29X

*Primary Examiner*—D. F. Duggan
*Attorney*—Frank R. Trifari

ABSTRACT: A vibrator motor comprising a bipolar stator and a multipolar armature adapted to oscillate about a stationary shaft. The armature includes first and second parts independently adjustable relative to each other.

INVENTOR.
JAN TIMMERMAN
BY
AGENT

VIBRATOR MOTORS

The invention relates to a vibrator motor for use in a dry-shaving apparatus. Such motors consist of a V-shaped, bipolar stator and a bipolar or multipolar armature located in the plane of the stator and adapted to oscillate about a stationary shaft, and on each side of a plane going through the centerline of the shaft at the center of the stator there is arranged an elastic body, preferably a spring, which bears on the armature at one end and the other end bears on a fixed base.

Such a construction of a vibrator motor is known. In order to obtain the correct position of the armature with respect to the stator, the elastic bodies and particularly springs, must be adjustable. The force exerted by the stator on the armature is at the maximum, when the armature is in the rest position with one of the armature poles, intersecting one of the sides of the stator pole. By providing adjustability of one spring or both, this position can be reached as near as possible.

In practice, it is found that owing to the tolerances of length and rigidity of the springs, and in the case of mass production of high precision, adjustment of the springs of each unit is necessary. Moreover, the adjustability of the springs is desirable for obtaining a correct natural frequency of the armature system. However, particularly in mass production, adjustment of the springs can by made only with difficulty and then only by skilled persons. Even if only one of the springs is adjustable it is not easy to attain the correct adjustment. The invention has for its object to simplify correct armature adjustment. To this end, in accordance with the invention, the poles of the armature of a vibrator motor, particularly of the kind set forth, are adjustably connected with the body of the armature so that the armature pole is movable with respect to the armature body.

The invention will be described with reference to the drawing, which shows a presently preferred embodiment of the invention and in which.

Figure 1:
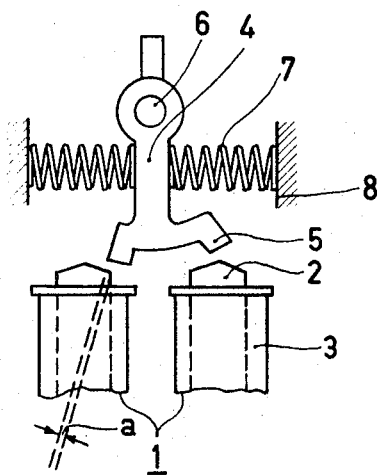
FIG. 1 shows two stator poles with the associated armature poles if a vibrator motor.

Referring to FIG. 1, reference numeral 1 designates part of a stator having two stator poles 2 and coils 3 arranged thereon. An armature 4 (shown in its rest position) with two poles 5 is adapted to rotate about a shaft 6 and is loaded by two pressure springs 7, each of which bears on a fixed base 8.

Figure 2:
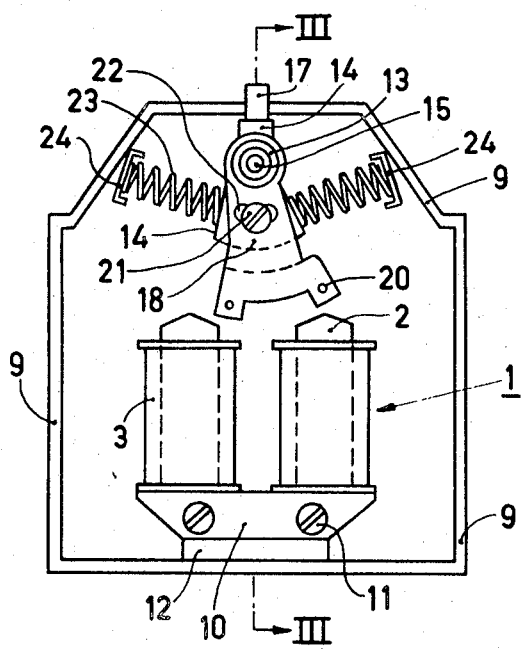
FIG. 2 is a partly diagrammatic front view of a vibrator motor.
Figure 3:
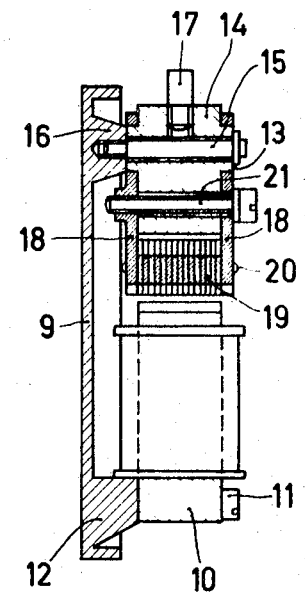
FIG. 3 is a sectional view of the motor of FIG. 2 taken on the line III—III in the direction of the arrow.

When the stator 1 is energized by an alternating current the armature oscillates about the shaft 6. It has been found that the force exerted by the stator on the armature is at a maximum when the armature is in the rest position and one of the armature poles is intersecting one of the sides of the stator poles. This means that the distance $a$ of FIG. 1 is at a minimum and preferably zero. Since in the mass production of such motors all parts and particularly the springs have certain tolerances in dimensions and properties, it is necessary to adjust the position of the armature with respect to the stator. A simple structure according to the invention for performing this adjustment is shown in FIGS. 2 and 3 to which reference is now made. A half housing 9 accommodates the stator 1 with poles 2 and coils 3. A stator yoke 10 is secured to a shoulder 12 on the housing by means of two screws 11.

The armature consists of a body 14, provided with two collars 13, which body is adapted to rotate about a pin 15 which is secured to a shoulder 16 provided on the housing 9. The body 14 is provided with a catching pin 17, which may for example drive the knife of a dry-shaving apparatus (not shown). Two armatures side plates 18 are adapted to turn about the collars 13. Between the armature side plates 18 there is arranged a pair of laminated armature poles 19. The two side plates 18 and the laminated portion 19 are interconnected by rivets 20.

The assembly of side plates 18 and the laminated poles 19 is movably fixed relative to the body 14 by means of a screw bolt 21. The apertures 22 in the side plates 18 through which bolt 21 extends are arcuately elongated as seen in FIG. 2. The armature body 14 is engaged by pressure springs 23 located on each side of the body 14. The other end of these springs bear on two supports 24 rigidly secured to the housing.

The correct adjustment of the armature with respect to the stator is now quite simple. When the volt 21 is loosened, the side plates 18 with the armature poles 19 can be turned about the collars 13 so that the armature poles are displaced relatively to the armature body as well as the stator poles so that the distance $a$ (FIG. 1) is at a minimum. Then the screw bolt 21 is tightened and the whole armature is then in its correct position relative to the stator. This adjustment can be performed by means of simple expedients by unskilled labor. The assembly is particularly suitable for mass production of large numbers of such motors.

I claim:

1. In a vibratory motor, a pivot shaft, a magnetic field-generating stator having arcuate pole faces adapted to be fixed centered on the axis of said shaft, a rotor unit including an armature member pivotally mounted on said shaft for oscillation, said armature member having arcuate pole faces centered on said axis for movement with respect to said stator pole faces from an at rest position whereat said armature pole faces overlap said stator pole faces by a predetermined degree of entry, said rotor unit further including an oscillator member pivotally mounted on said shaft and a driving arm extending from said oscillator member adapted for coaction with selected working means when said oscillator member is moved from an at rest position, said oscillator member and said armature member adapted for pivotal adjustment on said shaft individually and independently of each other for respectively positioning said driving arm and armature pole faces at their selected at rest positions, and means carried by said armature member and said oscillator member for securing said oscillator member to said armature member in said respective adjusted at rest positions for vibratory pivotal oscillation in unison on said shaft.

2. The combination of claim 1 wherein the armature member includes a pair of spaced support arms having apertures for pivotally mounting said armature member on said pivot shaft, said oscillator member being pivotally received between said arms, at least one of said arms having a slot defining an oversized opening for receiving a fastener member at a side of said oscillator member.

3. A vibratory motor comprising, support means, a stator carried by said support means, said stator having spaced ends provided with pole faces, a shaft mounted on said support means, a vibratory rotor unit mounted on said shaft, said rotor unit including an armature member having pole faces complementary to said stator pole faces, said rotor unit further including an oscillator member having a drive arm extending therefrom, means mounting said oscillator and armature adjacent each other on said shaft for movement individually of each other about said shaft, spring means supported at one end by said support means and at their opposite ends extending towards and engaging said rotor unit to maintain said oscillator member and said armature member at initial at rest positions on said shaft, said armature member being pivotally adjustable on said mounting means about said shaft away from the at rest position of the oscillator member to adjust the position of the armature pole faces at a selected overlap relationship with said stator pole faces, and means carried by said rotor unit for securing said armature member to said oscillator member in the adjusted position of said armature member and the initial at rest position of said oscillator member for vibratory pivotal movement in unison on said shaft.

4. A vibratory motor, comprising a U-shaped electromagnetic stator provided with arcuate pole faces on the ends of the spaced legs thereof, a shaft, an oscillator member pivotally mounted on said shaft and having at least one drive arm extending therefrom, spring means maintaining said oscillator member in a selected at rest position on said shaft, an armature member including a first portion provided with complementary armature pole faces centered on the axis of said shaft and a second portion comprising a pair of hanger arms pivotally mounting said armature on said shaft adjacent said oscillator, said armature member being pivotal on said hanger arms about said shaft relative to said oscillator to an adjusted moved position to establish a predetermined at rest position of said armature pole faces relative to said stator pole faces, and means carried by said armature and said oscillator for securing said armature member to said oscillator member against relative movement with respect to each other in the adjusted at rest positions of said members.

5. A vibratory motor for an electric shaver or the like, comprising support means, a U-shaped magnetic field stator mounted in fixed position on said support means and having arcuate pole faces on the ends of the legs thereof, a pivot shaft mounted on said support means and in centered relationship to said stator pole faces, an oscillator member pivotally mounted on said pivot shaft and having a drive arm extending therefrom adapted for driving engagement with a shaver cutter or the like, a pair of compression springs mounted on said support means and engaging opposite side surfaces of said oscillator member to establish an initial at rest position of said oscillator on said shaft, an armature member pivotally mounted on said shaft adjacent said oscillator and having arcuate pole faces complementary to said stator pole faces, said armature member being pivotally adjustable on said shaft independently of said oscillator member in said at rest position thereof for establishing a selected degree of entry of said armature pole faces relative to said stator pole faces, and means carried by said members for securing said armature and oscillator together in the adjusted position of the armature and the at rest position of the oscillator for vibratory pivotal movement in unison on said shaft.

6. A vibrator motor comprising a V-shaped, bipolar stator and a multipolar armature lying in the stator plane and adapted to oscillate about a stationary shaft, an elastic body engaging each side of said armature for urging said armature into its rest position, said armature comprising an armature body portion, a pair of armature pole portions, and connection means for connecting said pole portions and said armature body for relative movement, the connection means including a pair of side plates one on each side of the armature body portion, collar means located on the armature body concentrically with the stationary shaft for movably supporting said side plates, means for removably fixing said side plates relative to said armature body portion, and means for securing said pole portions between said side plates.

7. An electric vibrator motor operable from a source of electric power, comprising:
   a. a frame;
   b. a stator with at least two spaced pole faces;
   c. a shaft secured to the frame;
   d. an armature pivotable between at rest and activated positions, including (i) a first part having spaced pole faces corresponding to the pole faces of the stator, this part pivotally mounted on the shaft with the pole faces thereof movable adjacent an and relative to the stator pole faces, and (ii) a body part mounted on said shaft for pivotal movement independent of the first part to selected pivot positions relative to the body part;
   e. means for fixedly securing together as a unit the first part to the body part in one of said selected positions; and
   f. spring means engaging the frame and said armature unit for urging said unit toward said at rest position.

8. A motor according to claim 7 wherein the armature unit first part and body part are pivotable in generally parallel and adjacent planes.

9. An electric vibrator motor operable from a source of electric power, comprising:
   a. a frame;
   b. a stator with at least two spaced pole faces;
   c. a shaft secured to the frame;
   d. an armature including (i) a first part pivotal about said shaft with pole faces corresponding to those of the stator and movable between at rest and activated positions relative to the stator pole faces, (ii) a second part movable to selected positions relative to the first part, and (iii) means for fixedly securing together as a unit the first and second parts in one of said selected positions; and
   e. spring means engaging the frame and said armature unit for urging said unit to an at rest position.